(12) United States Patent
Tsai et al.

(10) Patent No.: US 9,671,666 B2
(45) Date of Patent: Jun. 6, 2017

(54) COLOR DISPLAY APPARATUS

(75) Inventors: Wei-Chen Tsai, Hsinchu (TW);
Chih-Yu Peng, Hsinchu (TW);
Lee-Tyng Chen, Hsinchu (TW);
Tung-Liang Lin, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 656 days.

(21) Appl. No.: 13/304,771

(22) Filed: Nov. 28, 2011

(65) Prior Publication Data

US 2012/0229741 A1    Sep. 13, 2012

(30) Foreign Application Priority Data

Mar. 11, 2011 (TW) .............................. 100108379 A

(51) Int. Cl.
*G02F 1/1335* (2006.01)
*G02F 1/167* (2006.01)

(52) U.S. Cl.
CPC ........ *G02F 1/167* (2013.01); *G02F 1/133514* (2013.01); *G02F 2202/28* (2013.01)

(58) Field of Classification Search
CPC .. G02F 1/1335; G02F 1/167; G02F 1/133514; G02F 2202/28; G02B 27/28
USPC ........................... 349/106–109; 313/503–504
See application file for complete search history.

(56) References Cited

U.S. PATENT DOCUMENTS

| | | | |
|---|---|---|---|
| 2003/0071567 A1* | 4/2003 | Eida et al. | 313/504 |
| 2004/0046909 A1* | 3/2004 | Sekiguchi | 349/113 |
| 2004/0051781 A1* | 3/2004 | Kawaguchi et al. | 348/34 |
| 2004/0242115 A1* | 12/2004 | Yanagawa | 445/25 |
| 2007/0013292 A1* | 1/2007 | Inoue | H05B 33/04 313/504 |
| 2007/0159588 A1* | 7/2007 | Yoon | 349/156 |

(Continued)

FOREIGN PATENT DOCUMENTS

| | | |
|---|---|---|
| CN | 100481359 C | 4/2009 |
| CN | 101493601 A | 7/2009 |

(Continued)

OTHER PUBLICATIONS

China Patent Office, "Office Action", Dec. 24, 2013.
Taiwan Patent Office, "Office Action", Jan. 14, 2014.
China Patent Office, "Office Action", Jun. 18, 2014.

*Primary Examiner* — Charles Chang
(74) *Attorney, Agent, or Firm* — WPAT, PC; Justin King; Douglas Hosack

(57) ABSTRACT

A color display apparatus includes a driving substrate, a color filter, a display layer and an adhesive. The color filter is faced to the driving substrate. The color filter includes a substrate and a filter layer, and the filter layer is disposed on the substrate and faced to the driving substrate. The display layer is disposed between the driving substrate and the color filter, and an orthographic projection of the display layer projecting on the filter layer is surrounded by a periphery boundary of the filter layer. An interval is existed between the orthographic projection of the display layer projecting on the filter layer and the periphery boundary of the filter layer. Besides, the adhesive is disposed between the display layer and the color filter, and a periphery boundary of the display layer and the periphery boundary of the filter layer are surrounded by the adhesive.

10 Claims, 2 Drawing Sheets

(56) References Cited

U.S. PATENT DOCUMENTS

| | | | |
|---|---|---|---|
| 2009/0027602 A1* | 1/2009 | Kobayashi | G02F 1/13363 349/118 |
| 2009/0050883 A1* | 2/2009 | Hayashi | H01L 51/5237 257/40 |
| 2011/0062859 A1* | 3/2011 | Kawamura | 313/504 |

FOREIGN PATENT DOCUMENTS

| | | |
|---|---|---|
| CN | 101706631 A | 5/2010 |
| CN | 101960917 | 1/2011 |
| TW | 200903050 A | 1/2009 |
| TW | 2010042346 A | 12/2010 |
| TW | 2010044027 A | 12/2010 |

\* cited by examiner

COLOR DISPLAY APPARATUS

FIELD OF THE INVENTION

The present invention relates to a display apparatus, and more particularly to a color display apparatus.

BACKGROUND OF THE INVENTION

With development of flat display technology, various kinds of display apparatuses are sequentially introduced for satisfy customer demand, wherein the electrophoretic display apparatus is widely used because its advantages of energy saving, light weight and thin thickness. Original electrophoretic display apparatus merely could display monochrome images. In order to realize color display, an electrophoretic display apparatus with a color filter is provided.

FIG. 1 is a schematic view of a typical color display apparatus. FIG. 2 is a schematic view of an orthographic projection of an electrophoretic display layer of FIG. 1 projecting on a color filter of FIG. 1. Referring to FIG. 1, the manufacturing process of the typical color display apparatus 100 includes the following steps. First, an electrophoretic display layer 120 is disposed on a display area 112 of a driving substrate 110, and then an adhesive 130 is spread on the electrophoretic display layer 120. Next, a color filter 140 is adhered on the electrophoretic display layer 120 by the adhesive 130. The process for adhering the color filter 140 includes aligning the color filter 140 with the driving substrate 110 to align a filter layer 142 of the color filter 140 with the display area 112 of the driving substrate 110. As shown in FIG. 2, an orthographic projection P1 of the electrophoretic display layer 120 projecting on the color filter 140 is just aligned with a periphery boundary 142a of the filter layer 142. That is to say, the orthographic projection P1 just covers the entire filter layer 142 but does not exceed the periphery boundary 142a of the filter layer 142. After aligning the color filter 140 with the driving substrate 110, the color filter 140 is pressed onto the adhesive 130. During pressing the color filter 140 onto the adhesive 130, the adhesive 130, which is not cured, flows to between the color filter 140 and the electrophoretic display layer 120 and further surround a periphery boundary 120a of the electrophoretic display layer 120. Therefore, a portion of the adhesive 130 exceeds the periphery boundary 142a of the filter layer 142. That is to say, the portion of the adhesive 130 is not covered by the filter layer 142. After pressing the color filter 140 onto the adhesive 130, the adhesive 130 is cured by ultraviolet (UV) light to fix the color filter 140 to the display layer 120.

However, when curing the adhesive 130, the UV light which illuminates a first portion of the adhesive 130 located between the displayer layer 120 and the color filter 140 passes through the filter layer 142 before illuminating the first portion of the adhesive 130. The UV light which illuminates a second portion of the adhesive 130 surrounding the periphery boundary 120a of the display layer 120 and the periphery boundary 142a of the filter layer 142 does not pass through the filter layer 142 before illuminating the second portion of the adhesive 130. Therefore, the light intensity of the UV light illuminating the second portion of the adhesive 130 is greater than that of the UV light illuminating the first portion of the adhesive 130, and this results in an excessively shrinking of the second portion of the adhesive 130 surrounding the periphery boundary 120a of the display layer 120 and the periphery boundary 142a of the filter layer 142. Accordingly, a periphery area of the display layer 120 will be lifted by the second portion of the adhesive 130 which is excessively shrunk, and an interval is formed between the periphery area of the display layer 120 and the driving substrate 110, thereby decreasing the display quality of the typical color display apparatus 100.

SUMMARY OF THE INVENTION

The present invention provides a color display apparatus with improved display quality.

In order to achieve at least of the above-mentioned advantages, an embodiment of the present invention provides a color display apparatus including a driving substrate, a color filter, a display layer and an adhesive. The color filter is faced to the driving substrate. The color filter includes a substrate and a filter layer, and the filter layer is disposed on the substrate and faced to the driving substrate. The display layer is disposed between the driving substrate and the color filter, and an orthographic projection of the display layer projecting on the filter layer is surrounded by a periphery boundary of the filter layer. An interval is existed between the orthographic projection of the display layer projecting on the filter layer and the periphery boundary of the filter layer. Besides, the adhesive is disposed between the display layer and the color filter, and a periphery boundary of the display layer and the periphery boundary of the filter layer are surrounded by the adhesive.

In one embodiment of the present invention, the display layer includes a plurality of color filter patterns, each of the color filter patterns has a length and a width, the interval existed between the orthographic projection of the display layer projecting on the filter layer and the periphery boundary of the filter layer is greater than three times of the length or greater than three times of the width.

In one embodiment of the present invention, the adhesive is a light curing adhesive.

In one embodiment of the present invention, the display layer is an electrical-paper display layer or a liquid crystal display layer.

In one embodiment of the present invention, the display layer includes an electrophoretic layer and a protection layer. The protection layer is fixed to the electrophoretic layer and disposed between the electrophoretic layer and the color filter.

In one embodiment of the present invention, the driving substrate is an active driving substrate.

In one embodiment of the present invention, the driving substrate is a passive driving substrate.

In one embodiment of the present invention, the color filter further includes a light shielding layer, and the light shielding layer is disposed on the substrate for isolating the color filter patterns.

In the color display apparatus of the present invention, the filter layer not only covers the display layer, but also covers an outer area adjacent the display layer. When performing a curing process of a manufacturing method for the color display apparatus, the light evenly illuminates the entire adhesive, so the entire adhesive is evenly cured, thereby preventing a periphery area of the display layer from being lifted. Therefore, the color display apparatus of present invention has better display quality.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
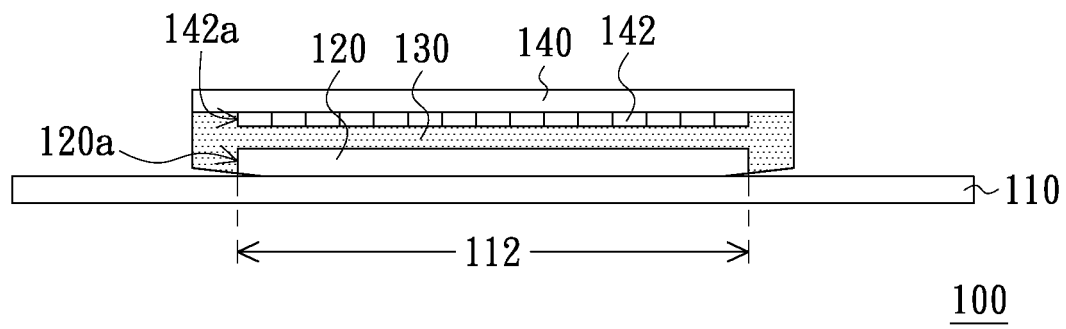
FIG. 1 is a schematic view of a typical color display apparatus.
Figure 2:
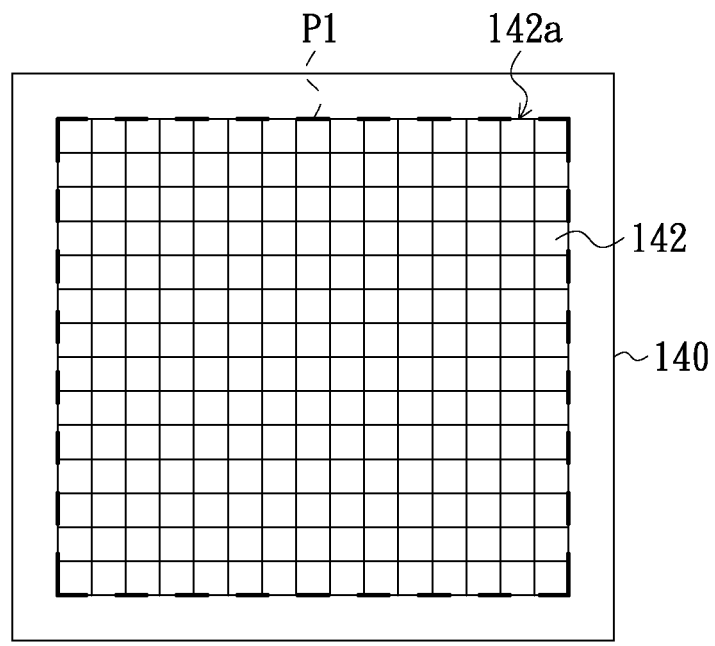
FIG. 2 is a schematic view of an orthographic projection of an electrophoretic display layer of FIG. 1 projecting on a color filter of FIG. 1.
Figure 3:
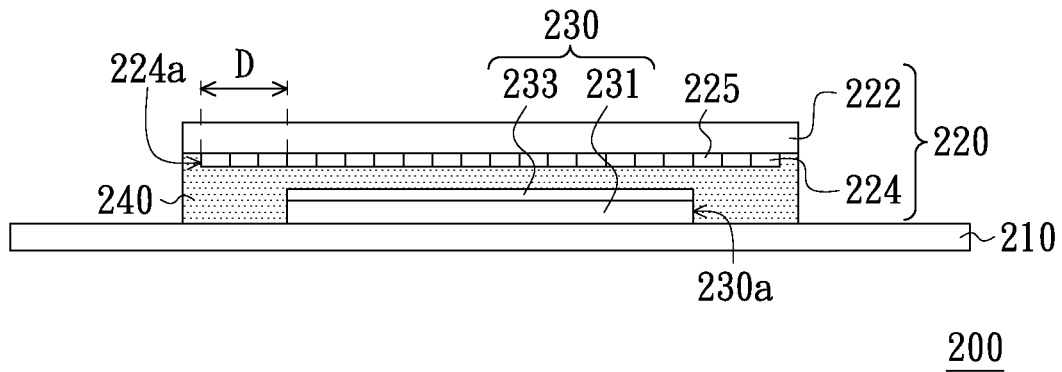
FIG. 3 is a schematic view of a color display apparatus according to an embodiment of the present invention.
Figure 4:
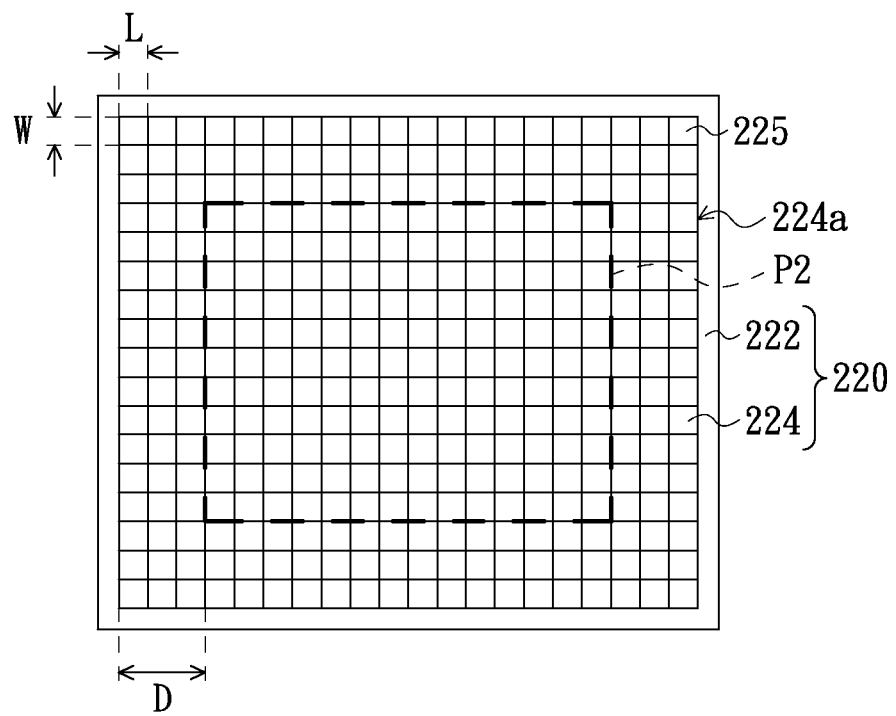
FIG. 4 is a schematic view of an orthographic projection of a display layer of FIG. 3 projecting on a color filter of FIG. 3.

FIG. 3 is a schematic view of a color display apparatus according to an embodiment of the present invention. FIG. 4 is a schematic view of an orthographic projection of a display layer of FIG. 3 projecting on a color filter of FIG. 3. Referring to FIGS. 3 and 4, a color display apparatus 200 of the present embodiment includes a driving substrate 210, a color filter 220, a display layer 230 and an adhesive 240. The color filter 220 faces to the driving substrate 210. The color filter 220 includes a substrate 222 and a filter layer 224. The filter layer 224 is disposed on the substrate 222 and faces to the driving substrate 210. The display layer 230 is disposed between the driving substrate 210 and the color filter 220, and an orthographic projection P2 of the display layer 230 projecting on the filter layer 224 is surrounded by a periphery boundary 224a of the filter layer 224. An interval D is existed between the orthographic projection P2 of the display layer 230 projecting on the filter layer 224 and the periphery boundary 224a of the filter layer 224. Besides, the adhesive 240 is disposed between the display layer 230 and the color filter 220, and a periphery boundary 230a of the display layer 230 and the periphery boundary 224a of the filter layer 224 are surrounded by the adhesive 240. That is, the filter layer 224 not only covers the display layer 230, but also covers an outer area adjacent the display layer 230. Therefore, a portion of the adhesive 240 surrounding the periphery boundary 230a of the display layer 230 is located below the filter layer 224.

The display layer 230 may be a liquid crystal display layer. The display layer 230 also may be an electrical-paper display layer such as a quick response liquid powder layer, a cholesteric liquid crystal display layer, an electrowetting display layer, an electrophoretic display layer or other suitable bistable display layer, and the electrophoretic display layer is taken as example in this embodiment. The display layer 230 may include an electrophoretic layer 231 and a protection layer 233. The electrophoretic layer 231 may be a microencapsulated electrophoretic layer or a microcup electrophoretic layer. The protection layer 233 is fixed to the electrophoretic layer 231 and disposed between the electrophoretic layer 231 and the color filter 220, so as to isolate the electrophoretic layer 231 and the color filter 220 and prevent the electrophoretic layer 231 from being polluted. The electrophoretic layer 231 and the protection layer 233 may be integrated into one piece, so as to be conveniently fixed to the driving substrate 210. The driving substrate 210 may be an active driving substrate or a passive driving substrate. The present invention does not limit the type of the driving substrate, and a proper type of the driving substrate will be selected according to design requirement.

The filter layer 224 of the color filter 220 includes a plurality of color filter patterns 225. The color filter patterns 225, for example, are disposed in an array, and the color filter patterns 225 may be isolated by a light shielding layer (not shown) disposed on the substrate 222. Material of the color filter patterns 225 may be, but not limited to, photoresist. Furthermore, the adhesive 240 may be, but not limited to, a light curing adhesive such as a UV curing adhesive. The adhesive 240 has a characteristic of being cured by specific light. For example, the UV curing adhesive may be cured by UV light. In addition, the shrinkage degree of the adhesive 240 increases accompanying with the increase of the curing degree of the adhesive 240.

When performing a curing process of a manufacturing method for the color display apparatus 200 of this embodiment, because the portion of the adhesive 240 surrounding the periphery boundary 230a of the display layer 230 is located below the filter layer 224, the intensity of the light illuminating the portion of the adhesive 240 surrounding the periphery boundary 230a of the display layer 230 is similar to the intensity of the light illuminating the portion of the adhesive 240 located between the display layer 230 and the color filter 220. Therefore, the adhesive 240 could be cured evenly, thereby preventing the portion of the adhesive 240 surrounding the periphery boundary 230a of the display layer 230 from being excessively shrunk. Thus, a periphery area of the display layer 230 will not be lifted, so the color display apparatus 200 of this embodiment has better display quality.

It should be noted that, in an embodiment of the present invention, for making the adhesive 240 be cured more evenly, the size of the filter layer 224 can further be limited. More concretely, each of the color filter patterns 225 has a length L and a width W, and the interval D existed between the orthographic projection P2 of the display layer 230 projecting on the filter layer 224 and the periphery boundary 224a of the filter layer 224 is, for example, about greater than three times of the length L or greater than three times of the width W. That is to say, at least three color filter patterns 225 could be arranged in the interval D. It should be noted that, the length L may be equal to or greater than the width W, but the proportion of the length L and the width W is not limited, and a proper proportion will be selected according to design requirement.

As mentioned above, in the color display apparatus, the filter layer not only covers the display layer, but also covers the outer area adjacent the display layer. Therefore, in the curing process of the manufacturing method for the color display apparatus, the intensity of the light illuminating the portion of the adhesive surrounding the periphery boundary of the display layer is similar to the intensity of the light illuminating the portion of the adhesive located between the display layer and the color filter, thereby preventing the adhesive from being unevenly cured. Thus, the periphery area of the display layer will not be lifted, so the color display apparatus of present invention has better display quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color display apparatus, comprising:
   a driving substrate;
   a color filter facing the driving substrate, the color filter comprising:
   a substrate; and
   a filter layer, disposed on the substrate facing the driving substrate, the filter layer comprising a plurality of color filter patterns;
   a display layer disposed between the driving substrate and the color filter, wherein an orthographic projection of the display layer projecting on the filter layer is entirely surrounded by a peripheral interval of the plurality of color filter patterns, and the width of the peripheral interval is greater than the width of one of the plurality of color filter patterns; and
   a light curing adhesive disposed between the display layer and the color filter, wherein the light curing adhesive is in contact with the driving substrate, the substrate of the color filter, the entire peripheral boundary of the display layer and the entire peripheral boundary of the filter layer.

2. The color display apparatus according to claim 1, wherein the display layer is an electrical-paper display layer.

3. The color display apparatus according to claim 1, wherein the display layer comprises:
   an electrophoretic layer; and
   a protection layer fixed to the electrophoretic layer and disposed between the electrophoretic layer and the color filter.

4. The color display apparatus according to claim 1, wherein the driving substrate is an active driving substrate.

5. The color display apparatus according to claim 1, wherein the driving substrate is a passive driving substrate.

6. The color display apparatus according to claim 1, wherein the color filter further comprises a light shielding layer and the light shielding layer is disposed on the substrate to isolate the color filter patterns.

7. The color display apparatus according to claim 1, wherein the display layer is a liquid crystal display layer.

8. The color display apparatus according to claim 1, wherein an orthographic projection of the color filter patterns of the filter layer projecting on the substrate of the color filter is surrounded by a periphery boundary of the substrate of the color filter, and an interval is existed between the orthographic projection of the color filter patterns of the filter layer projecting on the substrate of the color filter and the periphery boundary of the substrate of the color filter.

9. The color display apparatus according to claim 1, wherein an orthographic projection of the substrate of the color filter projecting on the driving substrate is surrounded by a periphery boundary of the driving substrate, and an interval is existed between the orthographic projection of the substrate of the color filter projecting on the driving substrate and the periphery boundary of the driving substrate.

10. The color display apparatus according to claim 1, wherein the width of the peripheral interval is greater than or equal to the combined width of three of the plurality of color filter patterns.

* * * * *